Patented Oct. 19, 1948

2,451,741

UNITED STATES PATENT OFFICE 2,451,741

PROCESS FOR THE MANUFACTURE OF UNSATURATED COMPOUNDS

Walter Huber, Basel, Switzerland, assignor to Hoffmann-La Roche Inc., Nutley, N. J., a corporation of New Jersey No Drawing. Application June 13, 1947, Serial No. 754,594. In Switzerland December 31, 1946

7 Claims. (Cl. 260—611)

1

This invention relates to the manufacture of unsaturated compounds, and more especially of low alkyl ethers of vitamin A and dehydro-vitamin A.

It is known that vitamin A ethers may be prepared synthetically by condensing 4-(2',6',6'-trimethylcyclohexene-(1')-yl)-2-methyl-butene-(2)-al-(1) with a Grignard-compound of 1-alkoxy-3-methyl-pentene-(2)-yne-(4), subjecting the 1-alkoxy-3,7-dymethyl-6-hydroxy-9-trimethylcyclohexeynl-nonadiene-(2,7)-yne-(4) formed to catalytic hydrogenation until 1 mol of hydrogen has been added to the triple-bond of said hydroxy compound, and heating the 1-alkoxy-3,7-dimethyl-6-hydroxy-9-trimethylcyclohexenyl-nonatriene-(2,4,7) thus obtained with a small proportion of iodine (compare Experientia, vol. II, year 1946, page 31; Festschrift für Emil Barell, year 1946, page 31). The sequence of the partial hydrogenation and the treatment with iodine may be inverted.

It has now been found, according to the present invention, that in the said process iodine may be replaced by compounds which easily split off iodine. Thus, the present specification provides for a process for the manufacture of unsaturated compounds, comprising reacting a compound of the formula

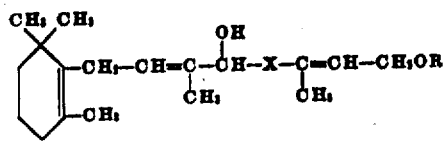

wherein

X stands for a radical selected from the group consisting of —CH=CH— and —C≡C—, and
R represents a low alkyl radical,

2 with a compound easily splitting off iodine in order to bring about allyl rearrangement and dehydration.

1-alkoxy-3,7-dymethyl-6-hydroxy-9-trimethylcyclohexenyl-nonatriene-(2,4,7) (I) or 1-alkoxy-3,7-dimethyl-6-hydroxy-9-trimethylcyclohexenyl-nonadiene-(2,7)-yne-(4) (IV) are used as starting materials for the present process. The preparation of these compounds may be effected according to the indications given in the papers cited above. The course of the reaction is deemed to follow the formulae hereafter:

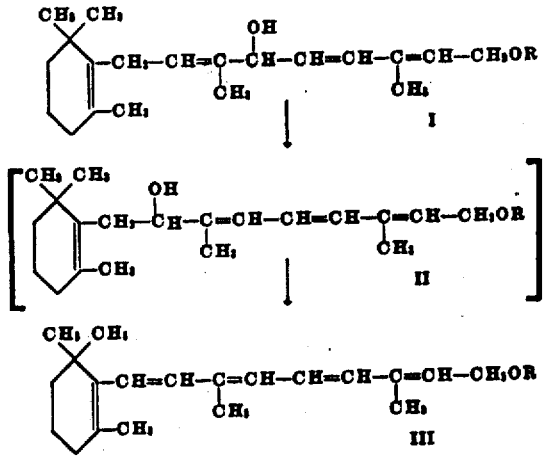

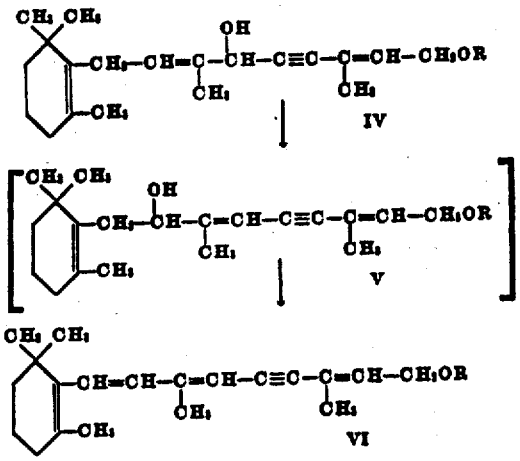

R stands for a low alkyl group.

The compounds obtained (III and VI) are vitamin A-alkyl ether or dehydro-vitamin A ether, respectively. The latter compound may be transformed into vitamin A alkyl ether by partial hydrogenation of the triple-bond.

As in the known process, using iodine, allyl rearrangement and dehydration occur in one reaction step if the starting materials are treated, according to the present invention, with a compound containing loosely bound iodine. Such iodine compounds are, for example, phosphorus iodides, hydrogen iodide and halogen iodides, furthermore metalloid iodides, such as arsonic and antimony iodides and organic compounds, such as iodine-pyridine complex compounds (e. g., I(pyridine)₂.NO₃) or carbon tetraiodide. In order to effect allyl rearrangement and dehydration, the starting materials, preferably in the presence of a diluent, are heated with one of the said iodine compounds. Thus, allyl rearrangement and dehydration may be carried out in pyridine solution at 0° C. by means of an equivalent quantity of phosphorus di-iodide. An advantageous method consists in heating the starting materials in an inert solvent having its boiling point between 80–140° C. with a small quantity of the iodine compound. Petroleum ether of boiling range 80–110° C. has proved to be a suitable solvent in which to effect allyl rearrangement and dehydration.

The vitamin A or dehydro-vitamin A alkyl ethers, obtained according to the above processes, may be isolated and purified by applying purification methods as commonly used for a concentrate of vitamin A and derivatives thereof from natural sources. The products must be protected against the deteriorating effects of light, air and heat, just like vitamin A from natural sources. The addition of anti-oxidants is advisable; such substances may be present during the whole course of the synthesis; tocopherols have, for example, proved to be useful as anti-oxidants.

*Example 1*

1 part by weight of 1-methoxy-3,7-dimethyl-6-hydroxy-9-trimethylcyclohexenyl - nonatriene-(2,4,7) in 20 parts by volume of petroleum ether of boiling range 80–110° C. is refluxed while stirring and introducing nitrogen. 0.02 part by weight of finely pulverised phosphorus di-iodide ($P_2I_4$) are added in the course of 5 minutes to the boiling solution. Refluxing is continued for 15 minutes; after cooling down, the mixture is diluted with petroleum ether of boiling range 30–60° C. and then repeatedly shaken with 95 per cent. methyl alcohol. While the dehydration products (about 0.7 part by weight) remain in the petroleum ether, unchanged starting material (about 0.3 part by weight) migrates into the methyl alcohol, from which it may be isolated in the usual manner and then reacted in boiling petroleum ether with phosphorus di-iodide in the said manner. The petroleum ether solutions, containing the products resulting from allyl rearrangement and dehydration are washed with water, dried with sodium sulfate and boiled down. A crude product containing 35–45 per cent. of vitamin A methyl ether is obtained.

This product may be purified, for example by a percolation chromatogram on to columns of weakly active aluminium oxide by means of petroleum ether of boiling range 60–80° C. Intermediates, having a free hydroxy group, adhere to the aluminium oxide, whereas by-products, absorbing light of lower wave lengths (280–290 m$\mu$) concentrate in the first runnings. Vitamin A methyl ether slowly migrates through the column during which process the position thereof may easily be ascertained by the intensive yellow-green fluorescence in ultra-violet light. The desired fraction is characterised by the stability of the Carr-Price-color reaction and by the high refraction of the residue. The purified vitamin A ether thus obtained is a yellow oil, boiling at 90–95° C. under a pressure of $10^{-5}$ mm. Hg. The compound proves to cause in the absorption spectrum the maximum at 320 m$\mu$, typical for vitamin A, and to possess high biological activity.

*Example 2*

4 parts by weight of 1-methoxy-3,7-dimethyl-6-hydroxy-9-trimethylcyclohexenyl - nonatriene-(2,4,7) are dissolved in 20 parts by volume of dry pyridine and 3 parts by weight of finely pulverised phosphorus di-iodide ($P_2I_4$) are added at 0° C. in several portions while stirring and introducing nitrogen. Stirring at 0° C. is continued for 1 hour whereupon petroleum ether of boiling range 30–60° C. is added. The solution is successively shaken out with ice-cold 1-normal sulfuric acid and sodium bicarbonate and water. The petroleum ether solution is then dried with sodium sulfate and boiled down. A crude product containing 10–15 per cent. of vitamin A methyl ether is obtained and may be purified in accordance with Example 1.

*Example 3*

1 part by weight of 1-methoxy-3,7-dimethyl-6-hydroxy-9-trimethylcyclohexenyl - nonatriene-(2,4,7) is refluxed in 20 parts by volume of petroleum ether of boiling range 80–110° C. while introducing nitrogen and stirring. 0.04 part by weight of 50 per cent. aqueous hydrogen iodide are added in several portions. The mixture is refluxed for another 15 minutes, left to cool down and worked up in accordance with Example 1. A crude product containing 40–50 per cent. of vitamin A methyl ether is obtained and may be purified in accordance with the directions given in Example 1.

*Example 4*

1 part by weight of 1-methoxy-3,7-dimethyl-6-hydroxy-9-trimethylcyclohexenyl - nonatriene-(2,4,7) is refluxed in 20 parts by volume of petroleum ether of boiling range 80–110° C. while introducing nitrogen and stirring. 0.02 part by weight of chlorine iodide in 3 parts by volume of petroleum ether of boiling range 80–110° C. are added in the course of 5 minutes. The mixture is refluxed for another 15 minutes, cooled down and worked up in accordance with Example 1. A crude product containing 30–40 per cent. of vitamin A methyl ether is obtained and may be purified in accordance with Example 1.

Bromine iodide may be used in the above example in place of chlorine iodide, whereby vitamin A methyl ether is obtained in equal yield.

*Example 5*

1 part by weight of 1-methoxy-3,7-dimethyl-6-hydroxy -9 - trimethylcyclohexenyl - nonatriene-(2,4,7) is refluxed in 20 parts by volume of petroleum ether of boiling range 80–110° C. while introducing nitrogen and stirring. 0.05 part by weight of I(pyridine)$_2$NO$_3$ are added to the boiling solution in several portions. The mixture is refluxed and stirred for 15 minutes, left to cool down and worked up according to Example 1. A crude product, containing 20–30 per cent. of vitamin A methyl ether, is obtained and may be purified according to the directions given in Example 1.

*Example 6*

10 parts by weight of 1-methoxy-3,7-dimethyl-6-hydroxy-9-trimethylcyclohexenyl - nonadiene-(2,7)-yne-(4) are refluxed in 200 parts by volume of petroleum ether of boiling range 80–110° C. while introducing nitrogen and stirring. 0.2 part by weight of finely pulverized phosphorus di-iodide ($P_2I_4$) are added to the boiling solution in the course of 5 minutes. Stirring and refluxing are continued for 15 minutes; then the mixture is left to cool down, diluted with petroleum ether of boiling range 50–60° C. and repeatedly shaken out with 95 per cent. methyl alcohol. While the dehydration products (about 5 parts by weight) remain in the petroleum ether, unchanged starting material (about 5 parts by weight) migrates into the 95 per cent. methyl alcohol and may be isolated therefrom in the usual manner and again treated in boiling petroleum ether with phosphorus di-iodide. The petroleum ether solution containing the products of the dehydration is washed with water, dried with sodium sulfate and boiled down. 7 to 8 parts by weight of a yellow oil are obtained, the main part of which proves to consist of 1-methoxy-3,7-dimethyl-9-trimethylcyclohexenyl-nonatriene-(2,6,8)-yne-(4) (dehydro-vitamin A methyl ether) which, by partial hydrogenation at the triple-bond, may be transformed into vitamin A methyl ether.

I claim:

1. Process for the manufacture of unsaturated compounds, comprising reacting a compound of the formula

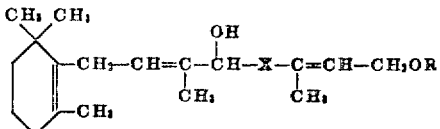

wherein X stands for a radical selected from the group consisting of —CH=CH— and —C≡C—, and R represents a low alkyl radical, with an iodo compound easily splitting off iodine in order to bring about allyl rearrangement and dehydration.

2. Process in accordance with claim 1, comprising using 1-methoxy-3,7-dimethyl-6-hydroxy-9-trimethylcyclohexenyl - nonatriene - (2,4,7) as starting material and effecting the reaction in an inert solvent of boiling range 80–140° C.

3. Process in accordance with claim 2, comprising using petroleum ether of boiling range 80–110° C. as solvent.

4. Process in accordance with claim 1, comprising adding an anti-oxidant to the reaction mixture.

5. Process in accordance with claim 1, comprising using phosphorus di-iodide as iodine-providing compound.

6. Process in accordance with claim 1, comprising using hydriodic acid as iodine-providing compound.

7. Process in accordance with claim 1, comprising using iodine halide as iodine-providing compound.

WALTER HUBER.

REFERENCES CITED

The following references are of record in the file of this patent:

Johnson, Acetylenic Compounds, vol. I (pages 234–5) (1946).

Experimentia, vol. III (page 31) (1946); Festschrift für Emil Barell, (page 31) (1946).

Certificate of Correction

Patent No. 2,451,741.   October 19, 1948.

WALTER HUBER

It is hereby certified that errors appear in the printed specification of the above numbered patent requiring correction as follows:

Column 1, line 10, for "dymethyl" read *dimethyl*; line 59, for "C," read *C—,*; column 2, line 4, for "dymethyl" read *dimethyl*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.* boiled down. 7 to 8 parts by weight of a yellow oil are obtained, the main part of which proves to consist of 1-methoxy-3,7-dimethyl-9-trimethylcyclohexenyl-nonatriene-(2,6,8)-yne-(4) (dehydro-vitamin A methyl ether) which, by partial hydrogenation at the triple-bond, may be transformed into vitamin A methyl ether.

I claim:

1. Process for the manufacture of unsaturated compounds, comprising reacting a compound of the formula

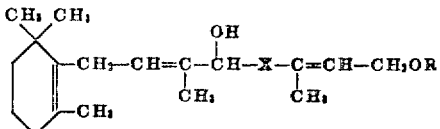

wherein X stands for a radical selected from the group consisting of —CH=CH— and —C≡C—, and R represents a low alkyl radical, with an iodo compound easily splitting off iodine in order to bring about allyl rearrangement and dehydration.

2. Process in accordance with claim 1, comprising using 1-methoxy-3,7-dimethyl-6-hydroxy-9-trimethylcyclohexenyl - nonatriene - (2,4,7) as starting material and effecting the reaction in an inert solvent of boiling range 80–140° C.

3. Process in accordance with claim 2, comprising using petroleum ether of boiling range 80–110° C. as solvent.

4. Process in accordance with claim 1, comprising adding an anti-oxidant to the reaction mixture.

5. Process in accordance with claim 1, comprising using phosphorus di-iodide as iodine-providing compound.

6. Process in accordance with claim 1, comprising using hydriodic acid as iodine-providing compound.

7. Process in accordance with claim 1, comprising using iodine halide as iodine-providing compound.

WALTER HUBER.

REFERENCES CITED

The following references are of record in the file of this patent:

Johnson, Acetylenic Compounds, vol. I (pages 234–5) (1946).

Experimentia, vol. III (page 31) (1946); Festschrift für Emil Barell, (page 31) (1946).

Certificate of Correction

Patent No. 2,451,741.      October 19, 1948.

WALTER HUBER

It is hereby certified that errors appear in the printed specification of the above numbered patent requiring correction as follows:

Column 1, line 10, for "dymethyl" read *dimethyl*; line 59, for "C," read *C—*,; column 2, line 4, for "dymethyl" read *dimethyl*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*